United States Patent
Yamaguchi

(10) Patent No.: US 7,598,484 B2
(45) Date of Patent: Oct. 6, 2009

(54) PHOTOELECTRIC SENSOR FOR SECURING THE SAFETY OF A WORK AREA

(75) Inventor: Akiji Yamaguchi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 12/114,941

(22) Filed: May 5, 2008

(65) Prior Publication Data

US 2008/0296474 A1   Dec. 4, 2008

(30) Foreign Application Priority Data

May 31, 2007   (JP) ............................. 2007-146259

(51) Int. Cl.
*G06M 7/00*   (2006.01)
*G01C 21/02*   (2006.01)
*G08B 13/18*   (2006.01)

(52) U.S. Cl. ..................... 250/221; 250/206.1; 340/555

(58) Field of Classification Search ................ 250/221, 250/206.1, 206.2, 559.4; 340/555, 556, 557; 901/46, 47; 356/3.01, 3.1, 4.07
See application file for complete search history.

(56) References Cited

U.S. PATENT DOCUMENTS

| | | | |
|---|---|---|---|
| 5,539,199 A * | 7/1996 | Ruckh et al. | 250/222.1 |
| 5,635,905 A * | 6/1997 | Blackburn et al. | 340/555 |
| 6,166,371 A * | 12/2000 | Milbrath et al. | 250/221 |
| 6,188,319 B1 * | 2/2001 | Frucht | 340/557 |
| 6,894,623 B2 | 5/2005 | Hama et al. | |
| 6,979,814 B2 | 12/2005 | Kudo et al. | |
| 2004/0189468 A1 * | 9/2004 | Brunner | 340/555 |
| 2005/0063114 A1 | 3/2005 | Suhara et al. | |

FOREIGN PATENT DOCUMENTS

| | | |
|---|---|---|
| JP | 03175390 | 7/1991 |
| JP | 04310890 | 11/1992 |
| JP | 2005004557 | 1/2005 |
| JP | 2005025479 | 1/2005 |
| JP | 2006308499 | 11/2006 |
| JP | 2006317237 | 11/2006 |

* cited by examiner

*Primary Examiner*—Georgia Y Epps
*Assistant Examiner*—Don Williams
(74) *Attorney, Agent, or Firm*—Kulyk & Bowersox, P.L.L.C.

(57) ABSTRACT

A photoelectric sensor according to the present invention, performs a determination as to whether or not an object is present in a predetermined detection area and provides (1) a enable signal to enable operation related to a hazardous source and (2) a disable signal to disable the operation based on a result of the determination. The photoelectric sensor determines whether or not the object is present within the predetermined detection area and whether or not the object is present at a reference point which is a different location within a measurement area from the predetermined detection area, based on a position information; and provides the enable signal when the object is absent from the predetermined detection area but the object is present at the reference point, and provides the disable signal when the object is present within the predetermined detection area and the object is absent at the reference point.

6 Claims, 6 Drawing Sheets

PHOTOELECTRIC SENSOR FOR SECURING THE SAFETY OF A WORK AREA

CROSS-REFERENCE TO RELATED APPLICATION

The present application claims priority from Japanese Patent Application No. 2007-146259, filed on May 31, 2007, the entire contents of which are hereby incorporated by reference.

BACKGROUND OF THE INVENTION

1. Field of the Invention

The present invention relates generally to a photoelectric sensor. More particularly, the present invention relates a photoelectric sensor for detecting an object within a predetermined detection area, and provides an enable signal for enabling operation of a target apparatus and a disable signal for disabling the operation of the target apparatus based on the result of the detection.

2. Description of Related Art

There have been known safety systems for setting an object detection area around a target apparatus such as machine tools and industrial robots. Such safety systems detect objects, for example workers or operators, in the predetermined detection area to interrupt a motion of the target machine, or otherwise disable operation of the target apparatus to provide a safe area around the target. Some of the safety systems have photoelectric sensors used as detectors for detecting an object around the target apparatus. Such photoelectric sensors emit a light beam toward a predetermined measurement area to scan an object detection area and receive a scanning light beam reflected by an object located in the measurement area, thereby detecting the presence or the absence of an object within the object detection area based on a signal representing an intensity of the reflected scanning light beam.

Japanese Laid-Open Patent No. H04-310890 describes a system, which is installed in a vehicle, for setting a measurement area around a vehicle which is the target apparatus, and for displaying a position of an external object such as a bicycle and the like on a display device when detecting the external object within the measurement area set around the vehicle. This system optically scans the measurement areas on the rear and the left of the vehicle, and shows a position of the bicycle or the like within the measurement area on the display device so as to provide secured safety to the vehicle against possible accidents when the system receives the reflected scanning light from the bicycle or the like within the measurement area. The system may take the form of an optical scanning device housed in a barrel casing as described, for example, in Japanese Laid-Open Patent H03-175390.

The above conventional optical scanners have the risk of failing to detect an object even if the object is present within an intended measurement area in the case where a preset measurement area, i.e. a scanning area of the optical scanner, does not match the intended measurement area due to an accidental incorrect disposition of the optical scanner or an accidental incorrect attitude of the optical scanner. In such a case, an area which is not covered by the measurement area, is present. As a result, the optical scanner can not detect an object to be detected in the uncovered area even though the object is present in the intended measurement area.

SUMMARY OF THE INVENTION

The present invention provides a photoelectric sensor and a setting method which can set a protective area against the target apparatus.

A photoelectric sensor according to the present invention, performs a determination whether or not an object is present in a predetermined detection area and provides (1) an enable signal to enable operation related to a hazardous source based on a result of the determination and (2) a disable signal to disable the operation. The photoelectric sensor determines whether or not the object is present within the predetermined detection area and whether or not the object is present at a reference point which is a different location within the measurement area from the predetermined detection area, based on the position information; provides the enable signal when the object is absent from the predetermined detection area but the object is present at the reference point; and providing the disable signal when the object is present within the predetermined detection area and the object is absent at the reference point.

The above-described problems associated with the prior art optical scanning devices are believed solved by the present invention. Specifically, according to the present invention, there is provided means for providing (1) an enable signal for enabling operation of a target apparatus when detecting no object in a predetermined detection area defined in a given scanning area but detecting an object present in a reference point or area defined in the given scanning area different from the detection area and (2) a disable signal for disabling the operation of the target apparatus when detecting an object present within the predetermined detection area or when detecting no object in the reference area.

In keeping with the teachings of the present invention, there is provided a photoelectric sensor of the type having an optical scanner for repeatedly scanning a plane area including a detection area and a photoelectric transducer for receiving scanning light reflected by an object in the detection area and generating a signal based on the received scanning light, the photoelectric sensor comprising:

setting means for defining a predetermined detection area in the plane scanning area and a reference area in the plane scanning area different from the detection area, and control means for calculating a position of an object based on both an angle of direction of the scanning light emitting from the optical scanner when the receiving signal is provided from the photoelectric transducer and a distance of the object represented by the receiving signal from the photoelectric transducer, determining, based on the position of the object, whether the object is present in the detection area and/or in the reference area, and providing an enable signal as the control signal when determining that an object is absent from the detection area but present in the reference area, and a disable signal as the control signal when determining that an object is present in the detection area and when an object is absent from the reference area.

Alternatively, the setting means may be capable of setting two or more reference areas. In this instance, it is preferred that each detection area is paired with one or more reference areas, the pairs of the detection area and the reference area being selectively enabled. The control means provides the enable signal when determining that the object is absent from the detection area but present in any one or more of reference areas, and the disable signal when determining that the object is present in the detection area and the object is absent from either reference area.

Further, the photoelectric sensor may be disposed in a partitioned area surrounded by a guard fence surrounding the apparatus. In this instance, it is preferred that the detection area is defined as an area located between an ingress/egress opening formed in the guard fence for allowing an object to access the apparatus of the partitioned area and the apparatus disposed in the partitioned area, and the reference area is defined as an area corresponding to the ingress/egress opening. The control means provides the enable signal when determining that the object is absent from the detection area is closed by an object.

According to the photoelectric sensor, safety of objects for example workers and operators associated with the apparatus, is reliably secured against the target apparatus. In particular, the photoelectric sensor is prevented from detecting undesirable objects different from an intended object even in circumstances where undesirable objects irregularly access to the apparatus, so that safety of the object against the apparatus is significantly improved.

BRIEF DESCRIPTION OF THE DRAWINGS

The foregoing and other objects and features of the present invention will be clearly understood from the following detailed description when reading with reference to the accompanying drawings in which.

DETAILED DESCRIPTION OF THE PREFERRED EMBODIMENTS

Figure 1:
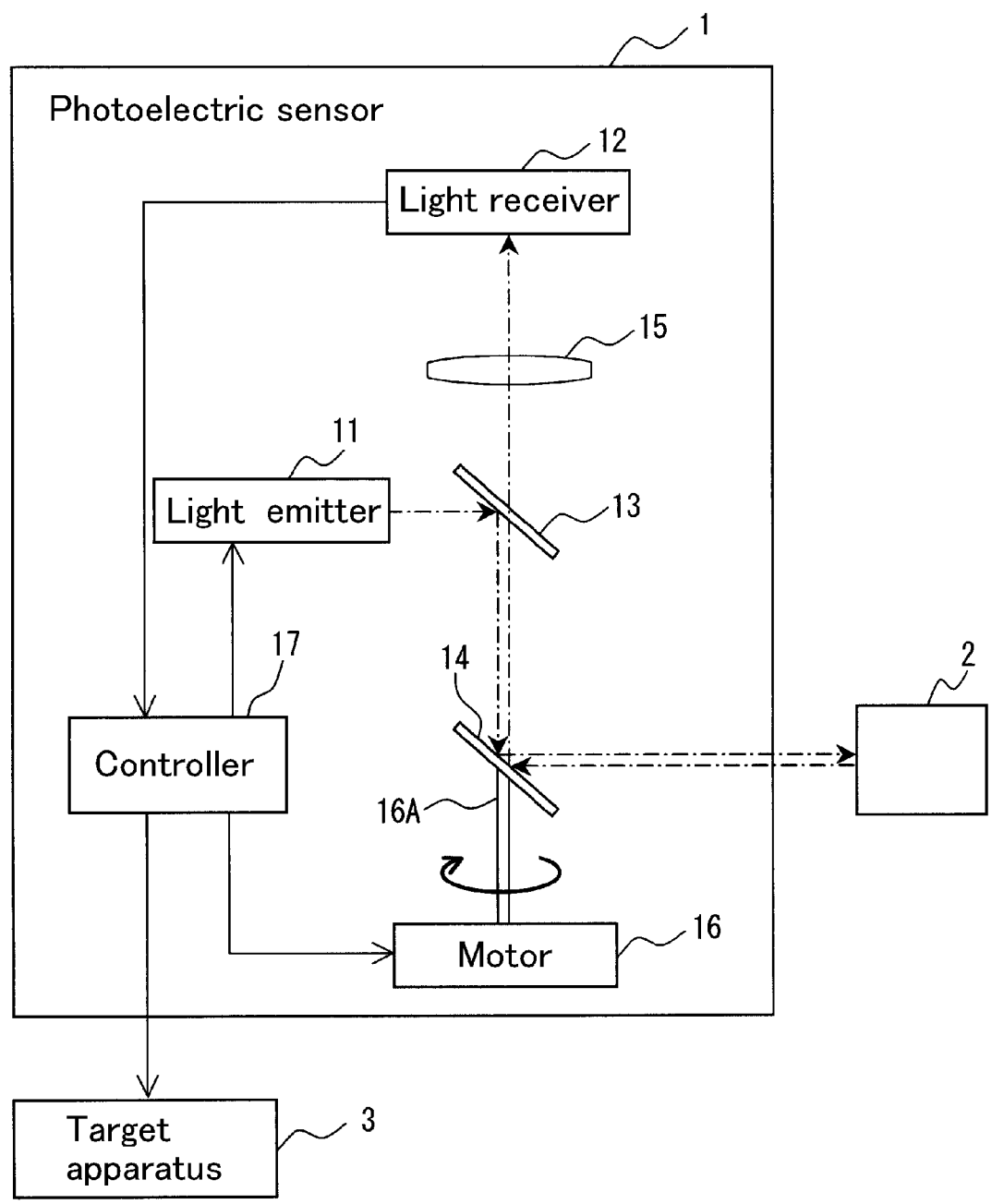
FIG. 1 is a block diagram illustrating a structure of a photoelectric sensor according to a first embodiment of the present invention.

Referring now to the accompanying drawings, and in particular, to FIG. 1 illustrating a structure of a photoelectric sensor 1 according to a preferred embodiment of the present invention, the photoelectric sensor 1 optically and repeatedly scans within a given plane area (which is hereinafter referred to a measurement area). In other word, a scanning light beam is directed over the measurement area. The scanning light beam is reflected on an object 2 when the object 2 is present in the measurement area. The photoelectric sensor 1 receives the scanning light reflected on the object 2 in the measurement area. Then, the photoelectric sensor 1 determines whether or not an object or objects are present within the measurement area based on the received scanning light. The photoelectric sensor provides a signal for a target apparatus 3 based on the result of the determination. In the specification, the target apparatus 3 is referred to various kinds of industrial apparatuses, such as machine tools and industrial robots performing a hazardous operation for workers and operators. The photoelectric sensor 1 provides an enable signal "ON signal" for enabling operation of the target apparatus 3 and a disable signal "OFF signal" for disabling operation of the target apparatus 3.

The photoelectric sensor 1 includes an optical scanner comprising an emitter 11, a beam splitter 13, a mirror 14, a motor 16 equipped with a photo encoder. The photoelectric sensor 1 further includes a lens 15, a receiver 12 and a controller 17 comprising, for example, a microprocessor. The beam splitter 13 and the mirror 14 are arranged in parallel to each other and coaxially with the lens 15. The emitter 11 constitutes an emitting means for generating an emitting light so as to detect the objects. The emitting light generated by the emitter 11 is reflected at an angle of 90 degrees toward the mirror 14 by the beam splitter 13. The light inputted from the beam splitter 13 is reflected at an angle of 90 degrees on the mirror 14. Then, the reflected light is emitted the outside of the photoelectric sensor 1.

The mirror 14 is coupled to a motor 16 through a rotating shaft 16A. When the motor 16 is driven, the mirror 14 is rotated around the rotating shaft 16A. An axis of the rotating shaft 16A is parallel to an optical axis of the emitting light transmitting from the beam splitter 13 to the mirror 14. Therefore, when the mirror 14 is rotated by the motor 16 through the rotating shaft 16A, an emitting direction of the scanning light directed to the outside by the rotating mirror 14 is continuously changed in a plane vertical to the axis of the rotating shaft 16A.

In this manner, the measurement area is defined by an area where the scanning light directed to the outside by the rotating mirror 14 covers. The emitter 11, the beam splitter 13, the mirror 14, the motor 16 and the rotating shaft 16A constitute an optical scanning means. Specifically, in this embodiment, the optical scanning means scans in the vertical plane at a scanning angle range of 270 degrees. Further, the emitter 11 is controlled to generate a pulsed light beam at each of a predetermined period, so the light beam is emitted to every angular interval of 0.36 degrees of the measurement area.

The photoelectric sensor 1 receives the scanning light if an object 2 is present in the measurement area. In more detail, the scanning light reflected from the object 2 and retuning to the mirror 14 is reflected at a right angle by the mirror 14 and directed toward the beam splitter 13. The reflected scanning light beam from the rotating mirror 14 passes through the beam splitter 13, then is condensed on the receiver 12 by the lens 15. In other words, the receiver 12 constitutes a receiving means for receiving the reflected light from the object 2 in the measurement area.

The controller 17 comprises a microprocessor, and controls the emitter 11 and the motor 16 and performs an operation to find the position of the object 2 relative to the photoelectric sensor 1 based primarily on a photoelectric signal corresponding to light received by receiver 12 and, in addition, provides control signals, as the enable signal and the disable signal mentioned above, for the target apparatus 3.

Figure 2:
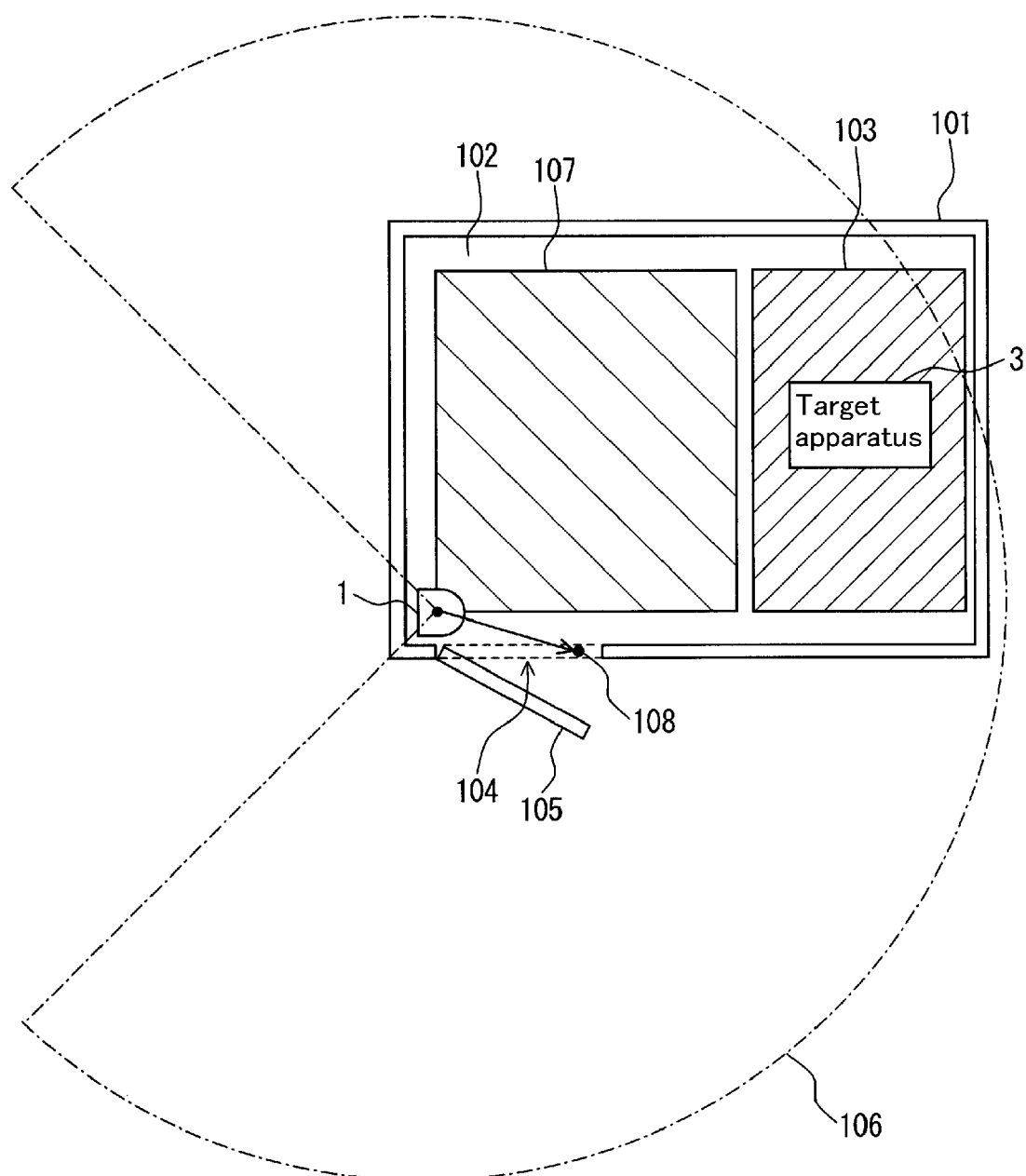
FIG. 2 is schematic view showing a system for securing safety against a target apparatus with a photoelectric sensor.

FIG. 2 shows a system for securing safety of workers and operators against the target apparatus 3 by utilizing the photoelectric sensor 1 shown in FIG. 1. In this embodiment, the target apparatus 3 is placed in a partitioned area 102 surrounded by a fence 101. An area around the target apparatus 3 in the partitioned area 102 is a hazardous area 103 in which there is a risk of damage for workers and operators due to the motion of the target apparatus 3. Further, there is provided a reference point 108 in the scanning field 106 different from a protective area 107.

The fence 101 has an ingress/egress opening 104 with a hinged door 5 for allowing operators to enter the partitioned area 102. The protective area 107, defined between the ingress/egress opening 104 and the hazardous area 103, is referred to as a first area for detection of a person who enters the protective area 107 through the ingress/egress opening 104 and approaches the hazardous area 103. A reference point 108, preferably a small circle, which is referred to as a second area, is defined on the hinged door 105 so as to vary the distance of the hinged door 105 from the photoelectric sensor 1 when the hinged door 105 is opened. The photoelectric sensor is placed in the partitioned area 102 and close to the ingress/egress opening 104. The protective area 107 and the reference point 108 is set in a measurement area 106 of the photoelectric sensor 1 defined by the covered area of the scanning light in the vertical plane.

Figure 3:
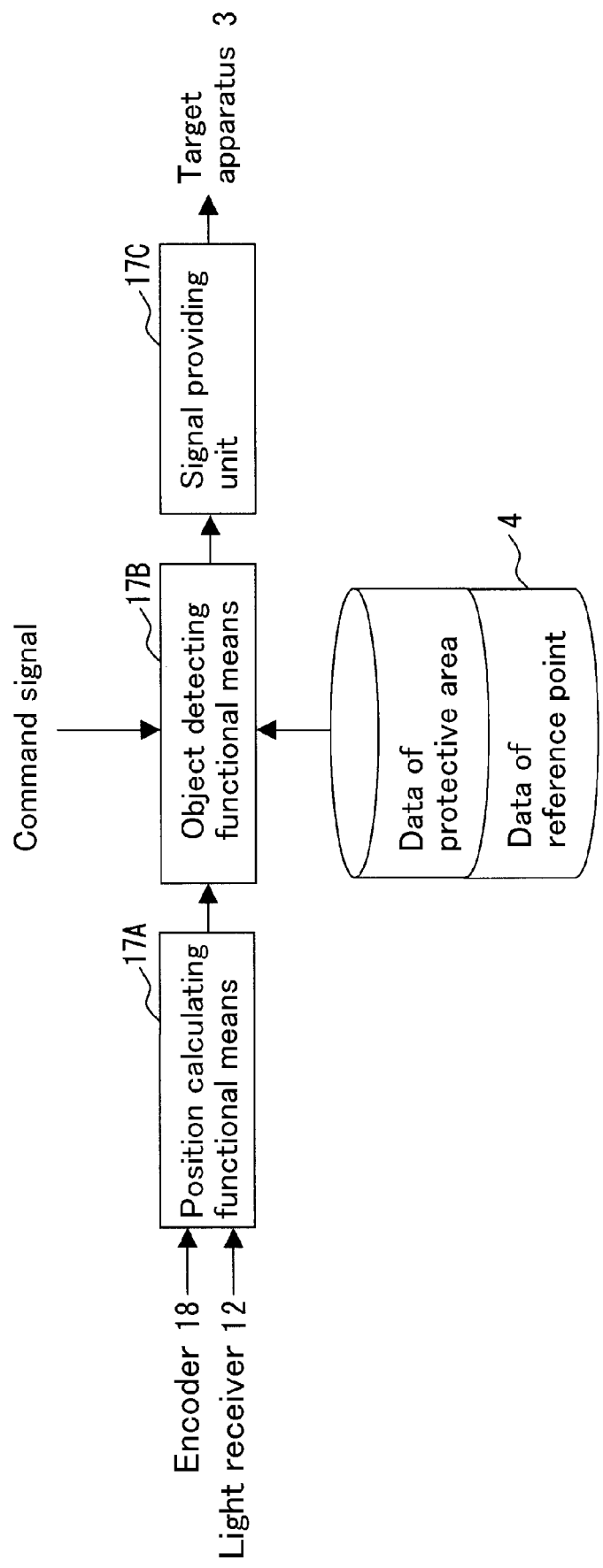
FIG. 3 is a block diagram illustrating a functional structure of an example of a controller.

FIG. 3 shows a functional structure of the controller 17. The controller 17 includes a position information calculating unit 17A, an object detecting unit 17B and a signal providing unit 17C. These functional units are performed by computer programs which the controller 17 executes. The position information calculating unit 17A receives a distance signal corresponding to the scanning light received by the receiver 12 and an angular signal representing a scanning direction from an encoder 18.

The encoder 18 detects a rotating angle of the rotating mirror 14 so as to provide the angular signal representing the scanning direction. In more detail, the encoder 18 comprises a rotating disc "not shown" coupled to the rotating shaft 16A of the motor 16, which has a plurality of slits arranged in a circular track with a predetermined angular interval; an emitting element "not shown" for emitting light toward the circular track including the slit on the rotating disc; and a receiving element "not shown" for receiving a light passing through the slit in the circular track on the rotating disc. A rotating angle of the mirror 14 rotated around the rotating shaft 16A is determined based on the number of the slits detected by the receiving element.

The position information calculating unit 17A is for calculating a position of the object 2 relative to the photoelectric sensor 1 based on the scanning direction (emitting direction) determined by a signal, representing the rotating angle of the rotating mirror 14, provided from the encoder 18 and the received signal of the scanning light, representing a distance of the object 2, provided from the receiver 12. In other word, the position information calculation unit 17A calculates a length of an optical path from the emitter 11 to the receiver 12 through the object 2 based on a flight period of the scanning light beam from emission at the emitter 11 to reception at the receiver 12. The position information calculation unit 17A calculates the position of the object 2 based on the half length of the optical path and the angle of the scanning direction.

The object detecting unit 17B detects the object 2 present in the protective area 107 and at the reference point 108 based on the position information calculated by the position information calculation unit 17A. In the embodiment shown in FIG. 2, an object 2 to be detected in the protective area 107 is a person such as an operator, and an object 2 to be detected in the reference point 108 is the closed hinged door 105. Therefore, the object detecting unit 17B aims to detect objects different from each other in the protective area 107 and the reference point 108, respectively.

The detection of the object 2 by the object detecting unit 17B is performed based on data representing the protective area and data representing the reference point both of which are stored in a memory 4. The data representing the protective area comprise positions of the protective area 107 relative to the photoelectric sensor 1. Thus, the data representing the protective area are defined by distance ranges from the photoelectric sensor 1 at the scanning directions respectively over the scanning range. The data representing the reference point comprise position information of the reference point 108 relative to the photoelectric sensor 1. Thus, the data representing the reference point are defined by a distance from the photoelectric sensor 1 at a particular scanning direction. Just like the protective area 107, when the calculated position of an object 2 by the position information unit 17A matches any position within the protective area defined by the data, representing the protective area, stored in the memory 4, the controller 17 determines that the object 2 is present in the protective area 107. When the calculated position of an object 2 by the position information unit 17A matches a point defined by the data, representing the reference point, stored in the memory 4, the controller 17 determines that the object 2 is present in the reference point 108.

The detection of an object associated with the protective area 107 can be regularly performed all the time. However, the detection of an object associated with the reference point 108 may be regularly performed, or otherwise performed as needed by an operator or an operation manager. In more detail, the detection of object associated with the reference point 108 may be performed in response to receiving an external signal. In this case, the term "all the time" includes performing at every scanning cycle. The memory may be installed in the photoelectric sensor 1, or may be installed in an external device "not shown" such as a personal computer for setting the photoelectric sensor 1 which is detachably connected to the photoelectric sensor 1.

The result of the detection by the object detection unit 17B is inputted to a signal providing unit 17C for providing an enable signal and a disable signal for the target apparatus 3 based on the result of the detection by the object detection means 17B. In other words, when the object is not detected in the protective area 107 but is detected in the reference point 108, this indicates that nobody is present in the protective area 107 enclosed by the guard fence 101 with the hinged door closed, and then, the signal providing unit 17C provides an enable signal for the target apparatus 3. On the other hand, when an object 2 is detected at least in the protective area 107, this indicates that someone is present in the protective area 107 or when an object is not detected in the reference point 108, this indicates that hinged door is opened, accidentally or irregularly, to allow someone to enter the partitioned area 102 surrounded by the guard fence 101, then, the signal providing unit 17C provides a disable signal for the target apparatus 3.

In an embodiment, position information about an object or objects in the protective area 107 and the reference point 108, individually, are calculated and, according to position information, an enable signal or a disable signal is provided corresponding to the calculated position information. Especially, when an object is detected in the protective area 107 and when the object is not detected in the reference point 108, these indicate that there is a high potential for an occurrence of an accident, and thus, a disable signal is provided to interrupt operation of the target apparatus. Further, when an object is not detected in the protective area 107 but detected in the reference point 108, this indicates that there is no risk of accident inside the guard fence 101 with the hinged door 105 closed, then, an enable signal is provided to allow the target apparatus to operate. Consequently, security inside the guard fence 101 against the target apparatus 3 is significantly improved.

Moreover, in the case where the photoelectric sensor is preset by the operating manager so that the photoelectric sensor 1 thins out, or otherwise, performs the detection of an object in the reference point 108 only when a command signal is inputted through the external device, the photoelectric sensor 1 is prevented from detecting undesirable objects different from the intended object 2, i.e. the hinged door 105 in one embodiment, even in circumstances where an undesirable object irregularly enters inside of the guard fence 101. Therefore, it is ensured to detect the hinged door 105 as an intended object in the reference point 108, so that security inside the guard fence 101 against the target apparatus 3 is significantly improved.

According to the security system shown by way of example in FIG. 2, the object 2 which exists in the protective area 107 within the partitioned area 102 where the target apparatus 3 is installed and the door 105 which is closed on the ingress/egress opening 104 to the partitioned area 102, can be detected. In this case, the disable signal can be provided when the object 2 is detected in the protective area 107 or when the door 105 which is closed on the ingress/egress opening 104, is not detected. On the other hand, the enable signal can be provided when the object 2 is not detected in the protective area 107 and when the door 105 which is closed on the ingress/egress opening 104, is detected.

For example, in the case where a person can enter the partitioned area due to the door 105 being accidentally opened, the disable signal is outputted at a timing when the closed door is just opened. Even though the door 105 is closed when the person is still remaining in the protective area 107, the enable signal is not outputted because the protective area 107 is also a part of inspection target of the photoelectric sensor 1. Therefore, the security against the target apparatus 3 can be improved.

Figure 4A:
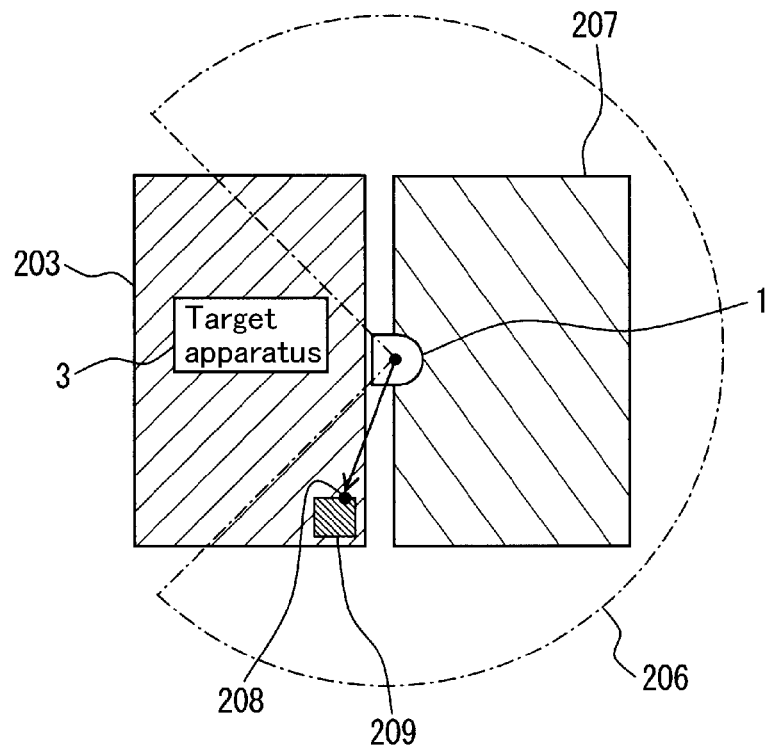
FIG. 4A is a schematic diagram showing an alternative system for securing safety against a target apparatus.
Figure 4B:
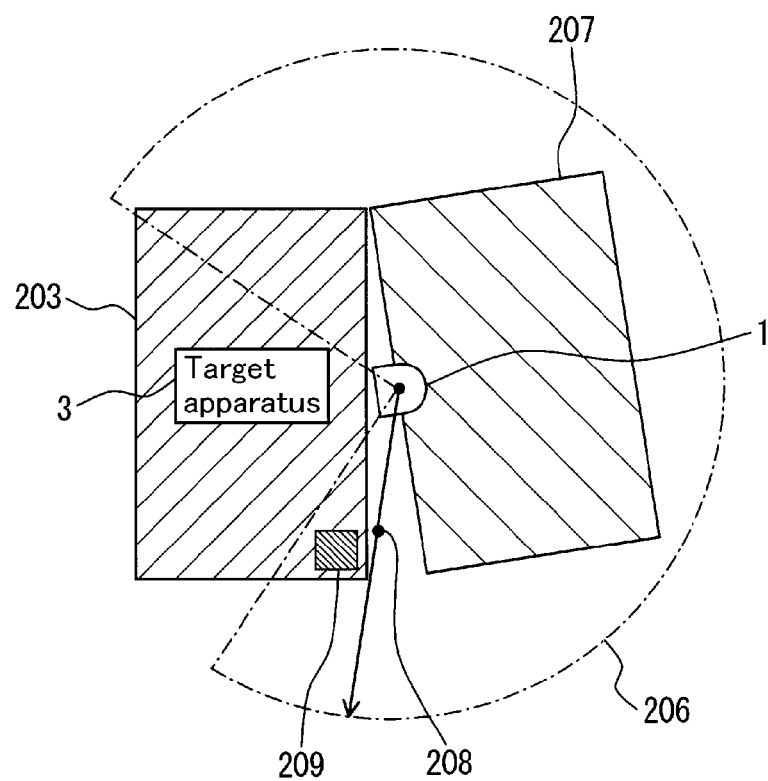
FIG. 4B is a schematic diagram showing the alternative system for securing safety against the target apparatus.

FIGS. 4A and 4B show an alternative embodiment of the security system for securing against the target apparatus 3 by utilizing a photoelectric sensor 1 according to an embodiment. In this system, while a protective area 207 and a reference point 208 are defined by a setting manner different from the above mentioned embodiment, nevertheless, the photoelectric sensor 1 is the same in structure as that of the above mentioned embodiment.

In the present embodiment, the reference point is set not on the hinged door 105 as an object which is shifting its position relative to the photoelectric sensor 1 but on a fixed object 209 such as a structural pillar in a fixed position relative to the photoelectric sensor 1. In this embodiment, there are provided the protective area 207 set adjacently to a hazardous area 203 surrounding the target apparatus 3. And, the reference point 208 set on the pillar as a fixed object 209 outside the protective area 207 but inside the hazardous area 203 in a measurement area 206 which is the part of scanning area of the photoelectric sensor 1.

As shown in FIGS. 4A and 4B, the photoelectric sensor 1 is installed in a correct position relative to the protective area 207 and the reference point 208. If, afterwards, the photoelectric sensor 1 is accidentally changed in position relative to either one or both of the protective area 208 and the reference point 208 as shown in FIG. 4B, the reference point 208 disappears from the fixed point 209 fixed in the specific position. Consequently, the photoelectric sensor 1 loses sight of the fixed object 209 in the reference point 208. When the photoelectric sensor 1 loses sight of the fixed object 209, the controller 17 provides a disable signal for interrupting operation of the target apparatus 3 regardless of the presence or the absence of the object 2 in the protective area 207. Therefore, the photoelectric sensor 1 is prevented from outputting an enable signal for enabling operation of the target apparatus 3 resulting from a failure to detect an object which should be detected under normal circumstances due to an accidental shift of the photoelectric sensor 1, and hence the protective area 207, in position. As a result, security against the target apparatus 3 is significantly improved.

In this embodiment, although a single reference point is used, nevertheless, the reference point 208 is not limited in number to the embodiment and may be two or more. In such a case, for example, it is preferred to divide the measurement area along the circumference (scanning) direction into a plurality of segments so that the individual segment shares at least one of the reference points 208.

Figure 5A:
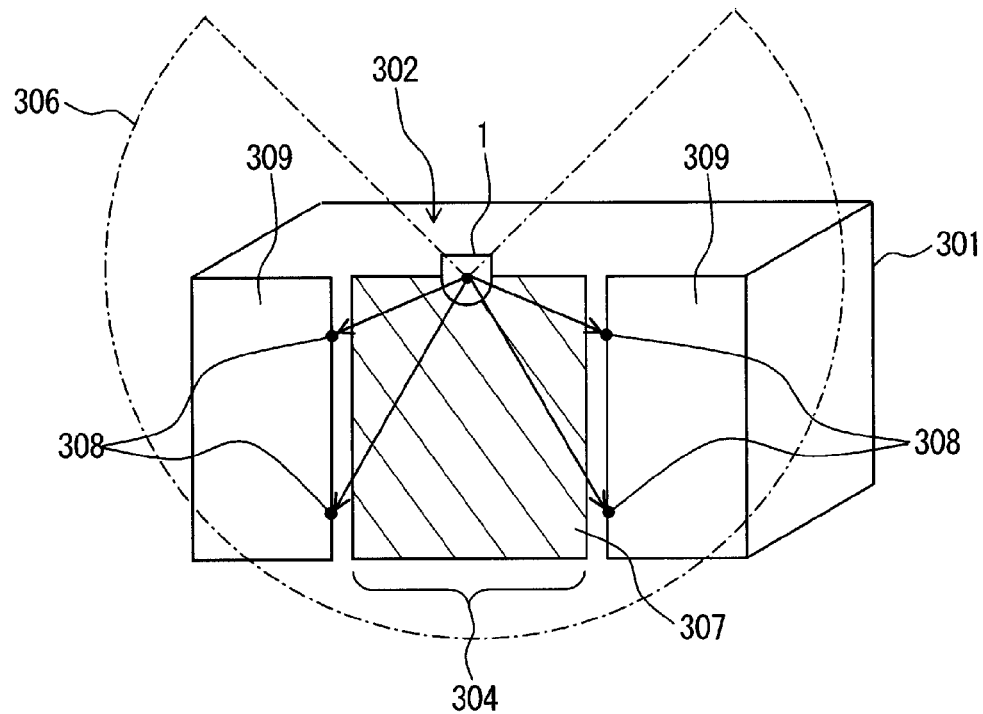
FIG. 5A is a schematic diagram showing another alternative system for securing safety against a target apparatus.
Figure 5B:
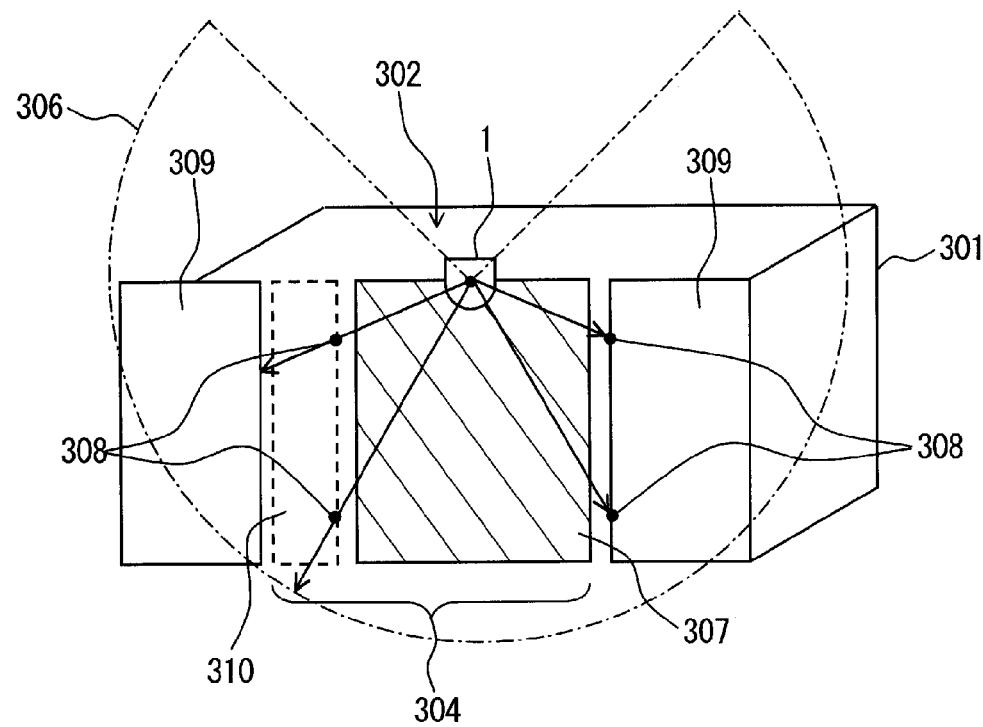
FIG. 5B is a schematic diagram showing the another alternative system for securing safety against the target apparatus.

FIGS. 5A and 5B show another embodiment of a security system for securing safety against a target apparatus 3 by utilizing a photoelectric sensor 1. In this embodiment, the manner of setting a protective area 307 and a reference point 308 is different from the first embodiment, however, the photoelectric sensor 1 is the same in structure as those of the sensor 1 shown in the first embodiment.

In this embodiment, the target apparatus 3 is disposed in a partitioned area 302 defined by a guard fence 301. The fence 301 has an opening formed thereon as an ingress/egress opening 304 for allowing an operator access to the partitioned area 302. The photoelectric sensor 1 is fixedly located in a position adjacent to the ingress/egress opening 304 so as to have a given scan field, i.e. a measurement area 306 in a vertical plane, that includes a protective area 307 and a plurality of, for example four in this embodiment, reference points 308.

The protective area 307 is provided so as to cover the entire ingress/egress opening 304, and is capable of capturing a person as an object intruding the partitioned area 302 through the ingress/egress opening 304. The reference points 308 are provided on opposite vertical edges of guard fence 301 (fixed objects 309). In other words, the reference points 308 are set on an edge of the fence 301 as a hem of the ingress/egress opening 304. In this embodiment, two reference points 308 are set on each fence edge, i.e. the fixed object 309. Although four reference points 308 are used, two for each fixed object 309, nevertheless, the reference point 208 is not limited in number to the embodiment and may be less than three or more than four for each fixed object 309. In the case where more than two reference points 308 are provided for each fixed object 309, it is preferred that at least two of the reference points 308 are provided on each fixed object 309 at opposite ends or in close vicinity to opposite ends of each fixed object 309 in a circumference scanning direction of the photoelectric sensor 1.

According to the embodiment, the photoelectric sensor 1 detects an object 2 passing into the partitioned area 302 through the ingress/egress opening 304 and fixed object 309. Specifically, a disable signal is provided for interrupting operation of the target apparatus 3 not only when an object 2 is detected in the protective area 307, which indicates that someone passes through the ingress/egress opening 304, but also when no fixed object 309 in the reference points 308 is detected, which indicates that the photoelectric sensor 1 is in a wrong position relative to the reference points 308. On the other hand, an enable signal is provided only when no object 2 is detected in the protective area 307 but all fixed objects 309 are detected in the reference points 308, since this indicates that there is no potential for an occurrence of an accident. In more detail, there are established five target areas of direction, one first object area (the ingress/egress opening 304) and four second object areas (the reference points 308), and the disable signal is provided when the object 2 is detected in the ingress/egress opening 304 and when no fixed object 309 is detected on any one or more of the reference points 308. On the other hand, the enable signal is provided only when no object 2 is detected in the ingress/egress opening 304 but the fixed objects 309 are all detected in each reference points 308, respectively.

As shown in FIG. 5A, the photoelectric sensor 1 is installed in a correct position relative to the protective area 307 and the reference points 308. If, afterwards, the ingress/egress opening 304 is expanded in width resulting from slippage of the side wall pane (the object 309) forming one of opposite side edges of the ingress/egress opening 304 as shown in FIG. 5B, this would allow a person to enter inside the guard fence 301 passing through an open area 310 other than the protective area 307. In such a case, since the object 309 is out of its primary position and not detected by the photoelectric sensor 1, the controller 17 provides a disable signal for interrupting operation of the target apparatus 3 regardless of the presence or the absence of an object 2 passing the protective area 307. As a consequence, safety against the target apparatus 3 is significantly improved.

Especially, in this embodiment, since there are established four reference points 308, two for each of the fixed objects 309 forming the ingress/egress opening 304, a single fixed object 309 is detected in two different reference points 308, so that the detection of fixed object is performed with increased reliability.

Figure 6:
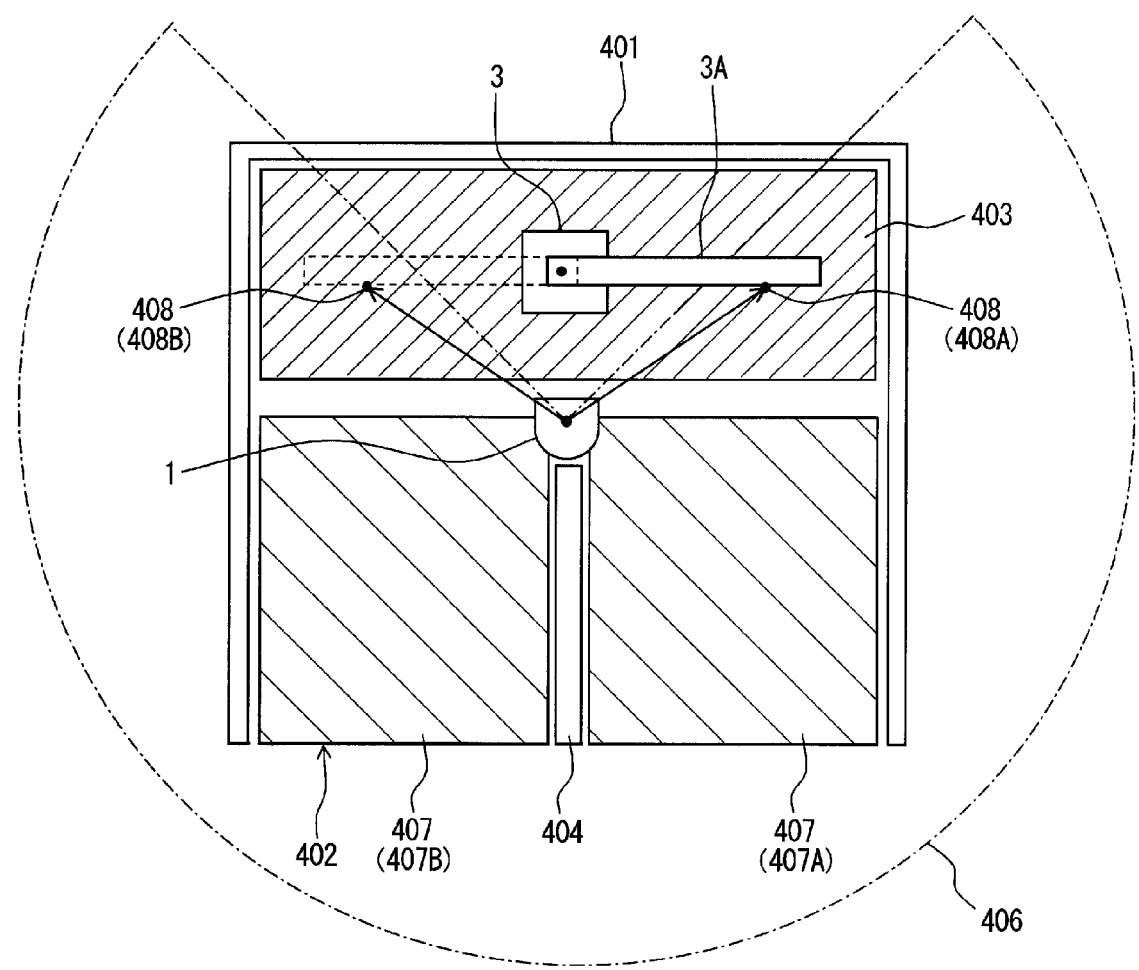
FIG. 6 is a schematic diagram showing a further system for securing safety against a target apparatus.

FIG. 6 shows still another embodiment of secure system against a target apparatus 3 equipped with a switch arm 3A by using the photoelectric sensor 1. In this embodiment, the manner in which a protective area 407 and a reference point 408 are set different from the previous embodiments, however, the photoelectric sensor 1 is the same in structure as those of the previous embodiments. As shown, the target apparatus 3 is installed in a partitioned area 402 surrounded by a guard fence 401. The switch arm 3A is capable of turning 180 degree between a first operative position shown by a solid line and a second operative position shown by a broken line for performing different operations. There is a hazardous zone 403 around the target apparatus 3A which fully covers the target apparatus 3 with the switch arm 3A in any operative position. There is further provided a center partition 404 for dividing protective area 407 into two parts, namely a first protective area 407A and a second protective area 407B. The first protective area 407A faces the switch arm 3A in the first operative position. The second protective area 407B faces the switch arm 3A in the second operative position. The photoelectric sensor 1 is fixedly attached to a front end of the center partition 404 so as to cover the whole protective area 407, i.e. both first and second protective areas 407A and 407B, and partially the switch arm 3A of the target apparatus 3 in the scanning field or measurement area 406. There is established reference points 408 on a side surface of the switch arm 3A of the target apparatus 3 in a position included in the measurement area 406. The first protective area 407A and the reference point 408A are correlated to each other to form a first group of areas of which position data is stored as a first area data set in the memory 4. Similarly, the protective area 407B and the reference point 408B are correlated to each other to form a second operative group of areas of which position data is stored as a second area data set in the memory 4. The first and second groups of areas are selectively made effective in accordance with a command signal provided by an operator through the external device. The protective area 407 and the reference point 408 of a selected group are made effective for detection of an object 2 and/or the arm 3A.

In this embodiment, an object 2 and the arm 3A are detected in the protective area 407 and the reference point 408 of the selected group. As a result, a disable signal is provided when the object 2 is detected in the protective area 407 of the selected group and when no arm 3A is detected at the reference point 408 of the selected group. On the other hand, an enable signal is provided only when the arm 3A is detected in the reference point 408 of the selected group while no object 2 is detected in the protective area 407 of the selected group. Therefore, when the arm 3A is not placed in the reference point 408 of the selected group, a disable signal is always provided regardless of a detection result of an object 2 such as a person in the protective area 407 of the selected group. As the result, safety against is significantly improved.

In this embodiment, although two pairs of groups are defined, nevertheless, the present invention is not limited in the number of the groups to this embodiment. For example, three or more pairs of the groups may be defined. In this case, when the pair of the groups which includes a plurality of protective areas 407 and a plurality of reference points, is selected, the disable signal can be provided when the object 2 is detected in either protective areas 407 and the arm 3A is not detected in either reference points 408. And the enable signal can be provided when the object 2 is not detected in every protective area but the arm 3A is detected at every reference point.

In the previous embodiments, although the second areas are described as points such as the reference points 108, 208, 308 and 408, nevertheless, the present invention is not limited to the previous embodiments. As in the first area such as the protective areas 108, 208, and 408, two or more reference area may be set. In this case, the reference area may be defined as a distance range from the photoelectric sensor 1 corresponding to every emitting direction from the photoelectric sensor 1 instead of a distance from the photoelectric sensor at a specified emitting direction.

The invention claimed is:

1. A photoelectric sensor for detecting an object in a predetermined detection area and providing a control signal which is either enabling operation of an apparatus or disabling operation of the apparatus based on a result of the detecting, the photoelectric sensor comprising:

setting means for defining a detection area in a predetermined plane area, and capable of setting a reference point in the plane area to a different area from the detection area;

a memory for storing both the detection area and the reference point;

an optical scanner for repeatedly and rotationally scanning around a rotational axis in the plane area including the detection area;

a photoelectric transducer for receiving a scanning light reflected by an object located in the plane area, and generating a receiving signal based on the received scanning light, and control means for calculating a position of the object based on both an angle representing an emitting direction of the scanning light and a distance of the object corresponding to the receiving signal from the photoelectric transducer, determining, based on the object position, whether the object is present in the detection area or in the reference point, and providing a enable signal as the control signal when determining that the object is absent from the detection area but present in the reference point, and a disable signal as the control signal when determining that the object is present in the detection area and the object is absent from the reference point.

2. The photoelectric sensor as defined in claim 1, wherein the control means is adapted to be operated by a user, wherein said user can determine whether a reference object is detected.

3. The photoelectric sensor as defined in claim 1, wherein the setting means is capable of two or more reference points, and the control means provides the enable signal when determining that the object is absent from the detection area but present in either reference point, and the disable signal when determining that the object is present in the detection area and the object is absent from either reference point.

4. The photoelectric sensor as defined in claim 1, wherein the setting means is capable of two or more detection areas and two or more reference points, each of the detection areas is paired with one or more reference points, and the pair of the detection area and reference point are selectively enabled, and the control means provides the enable signal when determining that the object is absent from the enabled detection area but present in either enabled reference point, and the disable signal when determining that the object is present in the enabled detection area and the object is absent from either enabled reference point.

5. The photoelectric sensor as defined in claim 1, wherein the photoelectric sensor is disposed in a partitioned area surrounded by a fence, the detection area is defined as an area located between an opening formed on the fence so as to allow an object to access the partitioned area and the apparatus disposed in the partitioned area, the reference point is defined as an area corresponding to the opening, and the control means provides the enable signal when determining that the object is absent from the detection area but the opening located at the reference point is closed by an object.

6. The photoelectric sensor as defined in claim 1, wherein the plane area is set in a vertical plane and corresponding to an opening for accessing the apparatus so as to detect an object passing through the opening, the detection area is defined as an area corresponding to a shape of the opening, and the reference point is defined as two or more areas which are located on an object forming the opening.

* * * * *